Aug. 3, 1965 W. H. STUART 3,199,063
ELECTRICAL ACCESSORIES AND FLUSH COVER PLATES THEREFOR
Filed March 16, 1962
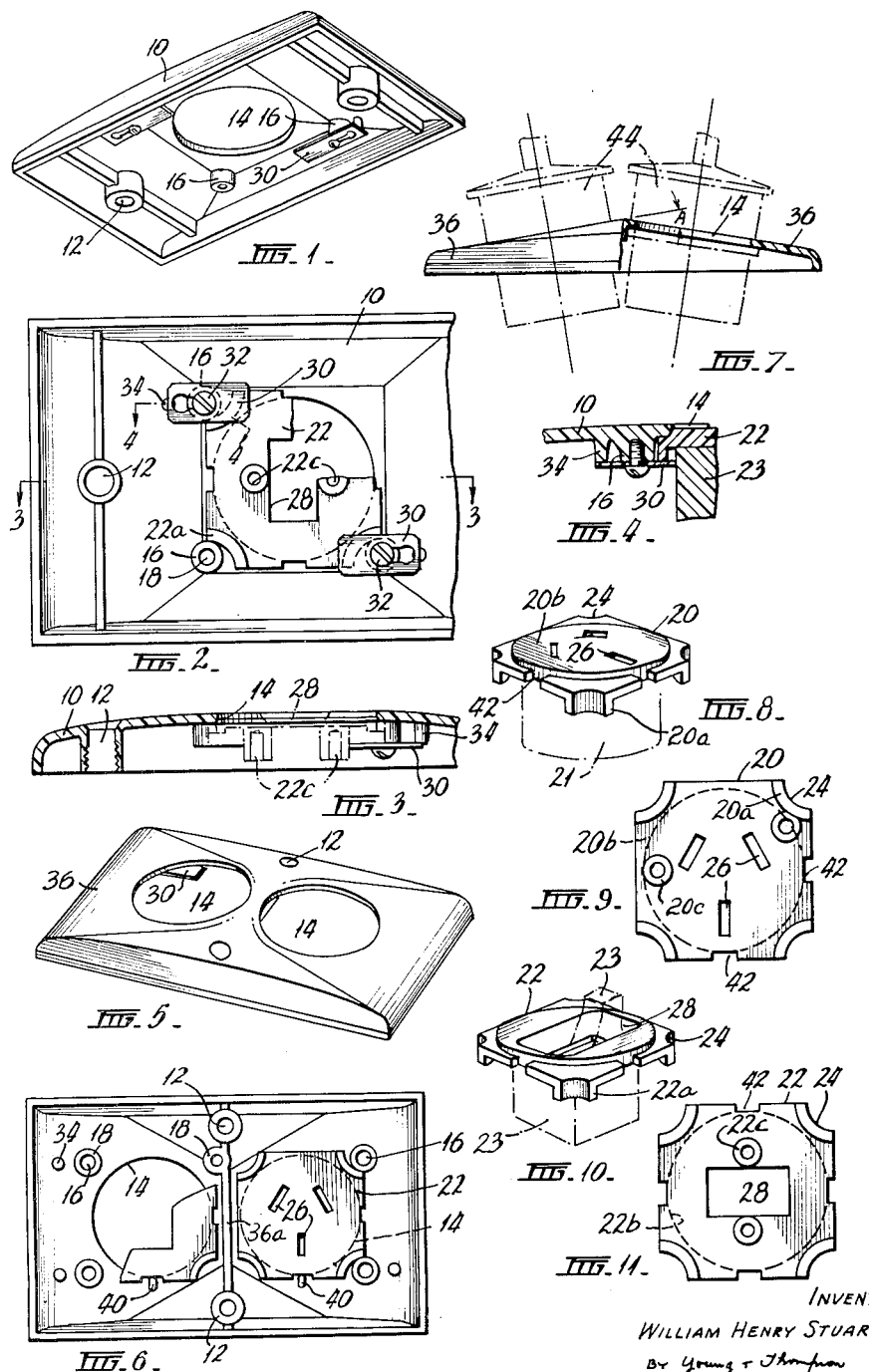
INVENTOR
WILLIAM HENRY STUART
BY Young + Thompson
ATTYS.

United States Patent Office 3,199,063
Patented Aug. 3, 1965

3,199,063
ELECTRICAL ACCESSORIES AND FLUSH COVER PLATES THEREFOR
William Henry Stuart, Abbotsford, Victoria, Australia, assignor to Ring-Grip (Australasia) Pty. Ltd., Abbotsford, Victoria, Australia, a company of Victoria, Australia
Filed Mar. 16, 1962, Ser. No. 180,194
Claims priority, application Australia, Mar. 20, 1961, 2,712/61, Patent 251,407
2 Claims. (Cl. 339—123)

This invention relates to flush mounting electrical accessories of the kind having a separable cover plate which extends in front of the accessory, e.g. an outlet socket connector, switch or the like, which is normally accommodated within a recess in a wall or the like, while the cover plate is disposed in front of and in contact with the wall surface so as to cover the recess and the accessory.

A considerable range of accessories of this kind is now necessary to suit all installation requirements and as at present constructed, each cover plate is generally limited to use with one particular accessory and vice versa. Thus, for example, existing cover plates for a switch and an outlet socket are not suitable for any other purpose.

The present invention includes a flush cover plate adapted for the alternative attachment to the back thereof of an outlet socket connector or other accessory, the said cover plate being formed with a hole to expose the forward end of the accessory and with means for locating engagement with said accessory in any one of a plurality of alternative angular positions thereof.

The invention also includes the combination with said cover plate of an outlet socket connector or other accessory, wherein the latter is provided with locating means adapted in each of said alternative angular positions thereof to coact with said locating means on the cover plate.

Preferably, but not necessarily, the forward end of said accessory comprises a front plate secured to a body member, the said front plate being provided with said coacting locating means.

The said accessory or front plate thereof is preferably provided at its forward end with a reduced shallow projection which is neatly receivable within the corresponding hole in the cover plate and said accessory or front plate is preferably detachably retained to a seating on the back of the cover plate by means of spaced clamping plates.

The invention also includes a cover plate adapted for the attachment to the back thereof, of a plurality of spaced accessories, the said cover plate being provided with a corresponding number of openings to expose the forward ends of said accessories, and including means on the back of the cover plate for locating each accessory in alignment with the corresponding hole, said locating means being similar whereby the positions of said accessories may be interchanged.

The invention also includes the combination with said cover plate of said accessories, especially a switch and an outlet socket connector.

According to another feature of the invention, a cover plate adapted for the attachment of two spaced accessories is formed with mutually inclined seatings for the latter so that the axes thereof converge rearwardly.

In the following more detailed description of exemplary forms of the invention, reference is made to the accompanying drawings in which:

FIGURE 1 is a perspective view from the underside of a cover plate for a single accessory, FIGURE 2 is a view in inverted plan of the cover plate shown in FIGURE 1, FIGURE 3 is a view in longitudinal section taken on the line 3—3 of FIGURE 2, FIGURE 4 is a fragmentary sectional view taken on the line 4—4 of FIGURE 2, FIGURE 5 is a perspective view from the front of a cover plate for two accessories, FIGURE 6 is a view in inverted plan of the cover plate shown in FIGURE 5, FIGURE 7 is a view in side elevation of the cover plate of FIGURES 5 and 6 and is shown partly in section, FIGURE 8 is a perspective view of the front plate of an outlet socket connector, FIGURE 9 is a view of the back thereof, FIGURE 10 is a view similar to FIGURE 8 of the front plate of a dolly switch, and FIGURE 11 is a view of the back of the plate shown in FIGURE 10.

The cover plate 10 shown in FIGURE 1, 2 and 3 is formed of any suitable material and is provided with clearance holes 12 whereby it may be attached to a wall or other support by screws. This cover plate is oblong in shape and has a hollow back as is usual in flush cover plates.

The cover plate is provided centrally with a relatively large circular hole 14 to expose the front of an electrical accessory attached to the back thereof as hereinafter described. The back of the cover plate is formed with three projecting bosses 16 arranged near the periphery of the central hole and so that a line connecting the axes of one adjacent pair thereof is parallel to the sides of the cover plate and so that a line joining the other adjacent pair is parallel to the ends of the plate. Each of these bosses is provided with an axial screw-threaded hole 18.

The cover plate is adapted for the attachment to the back thereof in any one of a plurality of different angular positions of a switch, outlet socket or other accessory, and for this purpose, the forward end of the accessory is formed with locating elements arranged to coact with the aforesaid bosses 16 in each of said different angular positions. The said forward end of the accessory may, according to the design thereof, be an integral part of the body of the accessory or it may be a member detachably secured to the said body.

Thus FIGURES 8 and 9 show a separable front plate 20 for an outlet socket connector 21 while FIGURES 10 and 11 show a similar front plate 22 for a dolly-operated switch 23.

These two front plates are equal in size and are square in shape except that each corner is formed with a clearance recess 24 for one of the aforesaid locating bosses 16 on the back of the cover plate, these clearance recesses being defined by flanges 20a and 22a on the respective plates. The forward face of each front plate conforms to and engages a seating provided on the back of the cover plate around the hole 14 therein and is formed centrally with a shallow circular projection 20b or 22b which is a neat fit within the said hole. The plate 20 is provided with access slots 26 for the pins of a connector plug while the plate 22 is formed with a clearance slot 28 for the dolly of the switch. Also the back of each of the illustrated front plates is formed with an appropriately spaced pair of bosses 20c or 22c provided with screw-threaded holes to enable the body of the socket connector or switch, as the case may be, to be secured thereto by screws.

Thus either of the said front plates 20 and 22 may be arranged on the back of the cover plate in any one of four alternative angular positions disposed mutually at right angles and in each of which the three locating bosses 16 on the cover plate engage three of the four coacting locating elements formed by the corner flanges 20a or 22a on the respective front plate as shown in FIGURE 2. The dolly clearance slot 28 of the plate 22 shown in this figure may thus be arranged either transversely with respect to the cover plate as illustrated, or longitudinally according to the manner in which the cover plate is to be mounted on the wall.

The front plate 20 or 22 is detachably secured to the cover plate by two metal clamping plates 30 each formed with a longitudinal slot for a screw 32 by which it is detachably secured to a corresponding one of the bosses 16. The inner ends of these clamping plates extend above and bear resiliently against the adjacent corner flanges 20a or 22a as the case may be, and as shown in FIGURE 4, while the outer ends of the clamping plates preferably rest on abutment projections 34 on the cover plate.

The cover plate may thus be used for the attachment thereto of any one of a variety of switches, outlet sockets and other accessories in four different angular positions with considerable resulting economies, because at present, it is usually necessary to provide a separate cover plate for each of these different purposes.

It will be apparent that the hole 14 in the cover plate is not necessarily circular in shape and that if it is non-circular, it may be utilised to locate the accessory in each of the required different angular positions. Thus, if, for example, this hole 14 and the interfitting projections 20a and 22a on the front plates 20 and 22 respectively were square in shape, it would not be necessary to provide locating projections such as the bosses 16 on the back of the cover plate.

FIGURES 5, 6 and 7 show a cover plate 36 provided with two longitudinally spaced holes 14 to expose the forward ends of two of the aforesaid separate accessories, e.g. two switches, two outlet socket connectors or one switch and one socket connector.

The back of this cover plate 36 is provided adjacent to each hole 14 therein with three locating bosses 16 which are arranged similarly to and serve the same purpose as the bosses 16 on the cover plate of FIGURES 1 and 2. The particular cover plate illustrated in FIGURES 6 and 7 also has a central transversely disposed reinforcing rib 36a within the hollow back thereof and this rib also serves to locate the adjacent sides of the coacting front plates 20 or 22 of the accessories when the latter are attached as shown in FIGURE 6.

The said accessories may be secured to the cover plate by clamping plates 30 as previously described and as one of the bosses 16 is arranged between the holes 14, the opposite ends of a single clamping plate secured thereto may be used to engage the adjacent corners of the two front plates 20 or 22 of the accessories.

The cover plate shown in FIGURES 6 and 7 also has a short radial projection 40 extending outwardly from the periphery of each hole 14 in transverse alignment with the axes thereof. These projections permit outlet sockets to be fitted in two alternative angular positions only and for this purpose each of two adjacent sides of the front plate 20 (FIGURE 9) is provided centrally with a clearance notch 42 for the projection 40 while each side of the front plate 22 of the switch is provided with a similar notch 42.

Preferably, and as shown in FIGURE 7, the opposite end portions of the front of the cover plate 36 incline downwardly and outwardly from the centre towards the opposite ends thereof so that the planes of these oppositely inclined faces intersect at a suitable angle "A" which may conveniently be about 10°–15°.

The opposite inclinations of the end portions of the double accessory cover plate 36 enables the holes 14 to be arranged closer together as will be evident from FIGURE 7 which shows two outlet sockets 21 fitted thereto. As the axes of these sockets diverge outwardly, sufficient clearance is provided for the enlarged outer ends of the connector plugs 44 even when the diameter of these ends exceeds the distance between the axes of the outlet sockets. Also, due to the inward convergence of the axes, the rear ends of the outlet sockets 21 are disposed closer together so that the minimum size of the accommodating cavity in the wall or the like is reduced.

The invention thus provides cover plates to which one or more alternative accessories may be attached, each in a plurality of alternative angular positions thus considerably reducing the ranges of cover plates and accessories which are necessary to meet a considerable number of different installation requirements.

I claim:

1. An assembly comprising a flush cover plate and an outlet socket detachably secured to the back of the cover plate, said cover plate being hollow at the back and having spaced holes extending therethrough whereby it may be secured to a wall by screws, said cover plate also being formed with a relatively large hole through which the forward end of the outlet socket is exposed, a seating on the back of the cover plate about said relatively large hole therein, coacting seating means on the forward end portion of the outlet socket, a plurality of spaced locating projections on the back of said cover plate, coacting locating means on the adjacent portion of said outlet socket whereby the latter may be arranged in any one of a plurality of angular positions spaced 90° apart, a plurality of angularly movable clamp plates mounted on the back of the cover plate, means forming shoulders on the outlet socket for engagement by said clamp plates and screws operable to secure and to release said clamp plates.

2. An assembly comprising a flush cover plate and an accessory detachably secured to the back thereof, said cover plate having spaced holes extending therethrough whereby it may be secured to a wall by screws, said cover plate being also formed with a relatively large hole through which the forward end of the accessory is exposed, a seating on the back of the cover plate about said relatively large hole therein, coacting seating means on the forward end portion of the accessory, coacting means on the cover plate and on the adjacent forward portion of the accessory for locating said accessory in each of a plurality of alternative angular positions spaced 90° apart, and operable securing means extending rearwardly from the back of the cover plate and having a laterally extending securing portion in contact both with the cover plate and with the accessory and accessible only from the back of the cover plate and positively and detachably securing the accessory to the back of the cover plate.

References Cited by the Examiner

UNITED STATES PATENTS

| Re. 19,092 | 2/34 | Despard | 174—66 X |
| 1,824,956 | 9/31 | Hubbell | 174—66 X |
| 2,012,875 | 8/35 | Guett | 174—66 |
| 2,488,976 | 11/49 | Huppert | 339—157 |
| 2,740,873 | 4/56 | Cronk. | |

FOREIGN PATENTS 321,184 11/29 Great Britain.
507,857 6/39 Great Britain.

LARAMIE E. ASKIN, *Primary Examiner.*

JOHN P. WILDMAN, JOHN F. BURNS, *Examiners.*